(12) United States Patent
Lehmann et al.

(10) Patent No.: US 8,376,618 B2
(45) Date of Patent: Feb. 19, 2013

(54) THRUST WASHER AND RADIAL/AXIAL BEARING HAVING SUCH A THRUST WASHER

(75) Inventors: Uwe Lehmann, Alzey (DE); Jurgen Klier, Taunusstein (DE); Thomas Grooteboer, Essenheim (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 427 days.

(21) Appl. No.: 12/742,826

(22) PCT Filed: Nov. 10, 2008

(86) PCT No.: PCT/EP2008/065211
§ 371 (c)(1),
(2), (4) Date: May 13, 2010

(87) PCT Pub. No.: WO2009/062904
PCT Pub. Date: May 22, 2009

(65) Prior Publication Data
US 2010/0260449 A1   Oct. 14, 2010

(30) Foreign Application Priority Data
Nov. 14, 2007  (DE) .......................... 10 2007 055 005

(51) Int. Cl.
*F16C 17/00* (2006.01)
(52) U.S. Cl. ....................................... 384/275; 384/294
(58) Field of Classification Search .................. 384/294, 384/275, 288, 296, 429, 430
See application file for complete search history.

(56) References Cited

U.S. PATENT DOCUMENTS

| 4,133,586 A | | 1/1979 | Maurer | |
|---|---|---|---|---|
| 4,652,150 A | * | 3/1987 | New | 384/275 |
| 5,267,797 A | * | 12/1993 | Brandt | 384/275 |
| 2003/0128902 A1 | * | 7/2003 | Kennedy | 384/275 |

FOREIGN PATENT DOCUMENTS

| DE | 24 12 870 A1 | 3/1974 |
|---|---|---|
| DE | 25 28 576 A1 | 6/1975 |
| DE | 33 45 652 A1 | 12/1983 |
| DE | 40 15 256 A1 | 5/1990 |
| DE | 41 40 277 A1 | 12/1991 |
| DE | 43 03 855 C1 | 2/1993 |

(Continued)

*Primary Examiner* — Thomas R Hannon
(74) *Attorney, Agent, or Firm* — Robert L. Stearns; Dickinson Wright, PLLC

(57) ABSTRACT

A thrust washer (14) in the form of a semi-circular flanged ring includes at least two radially inward-directed outer connection pieces (22) on the inner edge of the thrust washer (14) for the connection with a radial bearing part (12), which are located in the circumferential direction on both sides of a contrived centerline (M) of the thrust washer (14) and in each case have an inner edge (23) facing the center line (M) and an outer edge (23a) turned away from the centerline (M). The invention also relates to a radio axial bearing with a radial bearing part and a thrust washer of such a type connected with the radial bearing part. The inner edges (23) in each case include an angle (α), which is 45° and 85°, with a tangent on the inner side connected in the center of the connection piece (22) at the semi-circle described by the thrust washer (14), in which the outer edge (23a) runs parallel to the respective inner edge (23). Such a thrust washer (14) can be connected with a radial-axial bearing (10) with a radial bearing part (12).

13 Claims, 7 Drawing Sheets

FOREIGN PATENT DOCUMENTS

| | | |
|---|---|---|
| DE | 198 25 117 A1 | 6/1998 |
| DE | 10 2004 014410 A1 | 10/2005 |
| EP | 0 307 984 A | 8/1988 |
| EP | 1 320 690 B1 | 1/2007 |
| GB | 2 225 392 A | 5/1990 |
| JP | 02203014 A * | 8/1990 |

* cited by examiner

THRUST WASHER AND RADIAL/AXIAL BEARING HAVING SUCH A THRUST WASHER

BACKGROUND OF THE INVENTION

1. Technical Field

The invention relates to a thrust washer in the form of a semi-circular flanged ring with at least two radially inward-directed outer connection pieces on the inner edge of the thrust washer for the connection with a radial bearing part, which are located in the circumferential direction on both sides of a contrived centerline of the thrust washer and in each case have an inner edge facing the centerline and an outer edge turned away from the centerline. The invention also relates to a radial-axial bearing with a radial bearing part and a thrust washer of such a type connected with the radial bearing part.

2. Related Art

Radial-axial bearings are used, for example, in the manufacture of engines such as crankshaft bearings or the like. The radial bearing part can be designed as semi-cylindrical bearing shells or bushings. The radial-axial bearing can be connected to one or both frontal (axial) ends in each case with a thrust washer. The designation "semi-circular flange ring" also includes in terms of the invention such forms of the thrust washer, whose ends actually go beyond the bisecting partial plane or chord. Such forms are known, for example, from EP 1 320 690 A and serve to augment the surface of the thrust washer or as an assembling aid.

Basically two types of construction are known for the connection of the thrust washer(s) with the radial bearing part. In the case of so-called built-up bearings the radial bearing part and the thrust washer are latched with each other in a positive-locking and undetachable manner by means of correspondingly configured plates at the thrust washer and corresponding retaining openings at the radial bearing part. Embodiments of such built-up bearings are known, for example, from DE 43 03 855 C1, DE 33 45 652 A1, DE 41 40 277 A1 or EP 0 307 984 A2. The assembly of the bearing (subsequently the assembly of the axial and the radial bearing part to form a radial-axial bearing is designated by the term "assembly") requires a special tool or a specially equipped assembly machine due to the complex supply and latching movement or due to the additional working steps, in which the latches are fixed in place after the components are brought together. Therefore, the assembly is not infrequently carried out through manual intervention. Furthermore, the connection pieces and/or retaining openings have complicated and for this reason expensive geometries from a manufacturing standpoint, which ensure a secure connection between both of the components in the latched state.

In the second type of construction the radial-axial bearings are welded with each other. The radial bearing part in this type of construction has frontal recesses, in which the connection pieces of the thrust washer are inserted in the axial supply direction.

As a rule, a bearing half-shell has a spread angle, i.e., its basic shape, in contrast to the thrust washer is not precisely semi-circular, but rather is slightly bent open (as a rule a few tenths of a millimeter). The spread angle is removed during the mounting of the half-bearing in the bearing seat of a bearing housing or cover provided therefore (subsequently only precisely this is designated by the term "mounting"), so that the bearing shell is elastically compressed. Through the elastic reset force traction is achieved between the bearing shell and the bearing seat, which fixes the bearing shell in the mounted state and thus facilitates the mounting.

Generally, the spread angle must be removed beforehand depending on the geometry of the connection piece also during the assembly of the bearing shell and the thrust washer, until the connection pieces and the recesses align. Also here the elastic reset force after the assembly arranges for a force-fit cohesion of bearing shell and thrust washer. However, if the spread angle is already removed by the assembly of the bearing, the traction described above no longer or not sufficiently adjusts itself to the bearing seat during the mounting.

Since the thrust washer and the bearing half-shell in this type of construction are indeed connected with each other after the assembly as a rule in a force-locking, but not undetachable manner, they are connected with each other after being brought together at one or several locations of the outer circumference of the bearing half-shell on the face by welding. As an example, reference is made to DE-OS 25 28 576 A1 or DE-OS 24 12 870 A1 (the latter without explicit indication of a welded connection). It is disadvantageous, that also here a special assembly device is needed, which provides for a despreading of the bearing half-shell, and a special assembly machine is required equipped for the axial supply of the thrust washer.

A radial-axial slide bearing is known from DE 40 15 256 A1, in which the thrust washer has at least one radial dovetail-shaped connection piece, projecting inwards, which engages in a complementary recess of the radial bearing part, which tapers in the radial direction. The recess is therefore adjusted in the radial direction to the inclination of the arm and outer edges of the dovetail-shaped fastening piece, so that the axial bearing part is fixed both in the circumferential direction as well as in the radial direction with regard to the radial bearing part.

DE 198 25 117 A1 discloses a radial-axial bearing, with which the connection pieces of the thrust washer are formed free of undercuts in the radial direction through the summit of the flanged bearing shell or viewed in parallel thereto and are importable in this direction into retaining openings enclosed on all sides in the radial bearing part.

A flanged bearing shell is known from GB 2 225 392, in which the thrust washer has a connection piece conically tapered away in the axial direction from the radial bearing part. The assembly of both parts occurs, as the thrust washer with the retaining plate is inserted into a rectangular frontal recess in the radial bearing part and the corners of the recess are subsequently recast so that they form an undercut and fix the wedge-shaped connection piece in the axial direction.

SUMMARY OF THE INVENTION AND ADVANTAGES

It is the task of the invention to shape the thrust washer or the radial-axial bearing so that it permits a simplified and cost-efficient assembly in the case of the simultaneously simple and cost-efficient embodiment of the component parts. A further objective is to improve the radial-axial bearing with regard to the load bearing capacity of the thrust bearing.

The thrust washer is further developed according to the present invention in that the inner edges include an angle on the inner side, which is between 45° and 85°, with a tangent connected in the center of the connection piece to the semi-circle described by the thrust washer, and that the outer edge runs parallel to the respective inner edge.

Accordingly, the radial-axial bearing is further developed in that the outer connection pieces in the corresponding, frontal outer recesses engage in the radial bearing part, which in each case includes an inner edge facing the centerline of the thrust washer, which includes an angle on the inner side, which is between 45° and 85°, with a tangent connected in the center of the recesses to the circle or semi-circle described by the radial bearing part, and in each case have an outer edge turned away from the centerline of the thrust washer, which runs parallel to the respective inner edge.

In each case, the angle is understood as the angle "on the inner side," which, beginning on the inner edge, is spread by way of the connection piece in the direction of the centerline up to the tangent.

The geometry according to the present invention of the connection pieces and the recesses improves the positive-locking between the thrust washer and the radial bearing part with regard to the specific load situations, which occur in the case of the radial-axial bearings of this kind. Due to the acute angle between 45° and 85°, preferably between 55° and 75° and particularly preferable between 60° and 70°, the radial-axial bearing according to the present invention withstands higher forces or moments of force acting on the thrust washer without additional measures, as for example additional supports or latches to absorb the torque.

It is also advantageous, that the geometry according to the present invention in each case of parallel inner and outer edges of the bearing shell as well as the complementary geometry of the radial bearing part can be produced more simply from a manufacturing standpoint. Thereby a cost savings results in two respects. On the one hand, costs can be saved during the manufacture of the radial bearing part, as the complementary parallel inner and outer edges can be stamped out in a stamping-bending machine without re-clamping the workpiece after the bending of the board into a half shell or into a bushing in a simple stamping procedure. In contrast, the geometry of the recess complementary to the dovetail geometry from D1 (EP0307984A2) requires a reworking of the radial bearing part through milling. The additional expense in time, equipment and personnel increases the costs and at the same time the risk of error in the production. On the other hand, the cost saving results from the fact, that the parallel outer edges permit an effective savings in stamping out the thrust washers from a band. The stampings can follow each other more densely, so that less wastage accrues. If one wanted to realize a savings in the case of the thrust washers according to citation 1, this would be possible, as the outer connection pieces would be offset inwards in the circumferential direction, which in turn would lead to a reduced load, as will be elucidated subsequently by means of the figures. In an advantageous manner the outer connection pieces of the thrust washer and correspondingly also the recesses of the radial bearing part are spaced apart from a partial plane bisecting the flanged ring.

At the same time in the case of thrust washers of this kind a savings can thus be realized, due to the connection pieces relocated inwards from the partial plane in the circumferential direction, whereby the material costs can be reduced.

It is also advantageous, if the inner edges of the outer connection pieces and correspondingly the inner edges of the recesses run parallel to the partial plane or include an angle with the latter, which is not greater than ±15°, preferably not greater than ±10° and particularly preferable not greater than ±5°.

The radial-axial bearing according to the present invention can be designed in an embodiment of the invention as a bearing half-shell. In this case, due to the geometry according to the present invention and arrangement of the connection pieces or the recesses of this arrangement the spread angle of the bearing half-shell must not be removed during the assembly. The ends of the bearing half-shell on the circumference are free to move in the radial direction to the extent of the spread angle that is, unhindered by the geometry of the connection pieces in its movement. Through this the spread angle is only completely removed during the mounting of the bearing in the bearing seat and the traction between the radial bearing part and the bearing seat fixes the bearing after the mounting. But that is also to say, that the bearing half-shell and the thrust washer are not held together in a force-locking manner by clamping. Therefore, to facilitate the assembly either a positive-locking or a material-locking connection must be used.

Preferably the connection pieces are arranged symmetrically to the centerline.

Through a symmetrical arrangement of the connection pieces the same high load bearing capacity is can be achieved independent of the alignment of the bearing shell in the bearing seat or of the rotational direction of the counter-rotor (for example, crankshaft).

Furthermore, the thrust washer according to the present invention preferably has a third central connection piece directed radially inwards located on the inner edge, which is arranged offset to the centerline.

Through the asymmetrical arrangement and a correspondingly asymmetrical alignment of the corresponding retaining openings in the radial bearing part the orientation of the thrust washer is defined distinctively relative to the radial bearing part. Through this measure an inadvertently false orientation of the thrust washer during the assembly with the radial bearing part can be excluded.

According to an advantageous further development the thrust washer has supports directed radially inwards located on its inner edge.

The supports form contact surfaces, which ensure a defined distance and a coaxial alignment between the thrust washer and a radial bearing part. They interact in a manner known per se with the connection pieces for torque support.

In the process, the contact surfaces are preferably arranged symmetrically on both sides to the centerline and inside of the two outer connection pieces.

The symmetrical arrangement once more ensures a mounting of the bearing independent of direction. The arrangement inside of the two outer connection pieces in turn ensures the free mobility in the radial direction of the circumferential ends of the radial bearing part.

The thrust washer is connected according to an advantageous further development of the radial-axial bearing with the radial bearing part by means of a welded connection. The cohesion between radial bearing part or bearing half-shell and the thrust washer is therefore produced preferably by a material-locking connection.

The welded connection is preferably effected through laser welding or through spot welding. This welded connection is particularly preferably designed as a predetermined breaking point, which breaks through the operational load during the introduction of a defined tangential and/or axial force.

As is also known, for example, from DE 10 2004 014 410 A1, the welded connection thus serves as a temporary connection for the transport and for the simplification of the assembly. As an offset of the tolerance-induced inaccuracies of the bearing house or of the counter-rotor a slight axial and radial play is desired between the thrust washer and the radial bearing part. Therefore, the rigid welded connection should break open in operation and the axial bearing part (the thrust washer) and the radial bearing part should be released for a relative movement. The welding parameters can therefore be adjusted, so that the welded connection does not withstand the forces in the tangential direction exerted on the welded connection by the torque during the start-up of the counter-rotor (the crankshaft or the like). A configuration of the welded connection is to be determined depending on the application, bearing size, contact surface between the counter-rotor and thrust washer, material combination (bearing material and counter-rotor), etc.

Preferably, the thrust washer is welded with the radial bearing part. Particularly preferable for this purpose the thrust washer has a radially inward-directed lug on its inner edge.

During the despreading only the circumferential ends of the bearing shell in the radial direction are pressed together. In the summit region, thus in the center of symmetry of the bearing shell no relative movement should take place between the bearing shell and the thrust washer. Thus, the welded connection is preferably located here.

The radial bearing part of the radial-axial bearing according to the present invention is preferably a bearing half-shell.

THE DRAWINGS

Further details, characteristics and advantages of the invention are elucidated in detail below by means of an execution example with the aid of the drawings.

Figure 5:
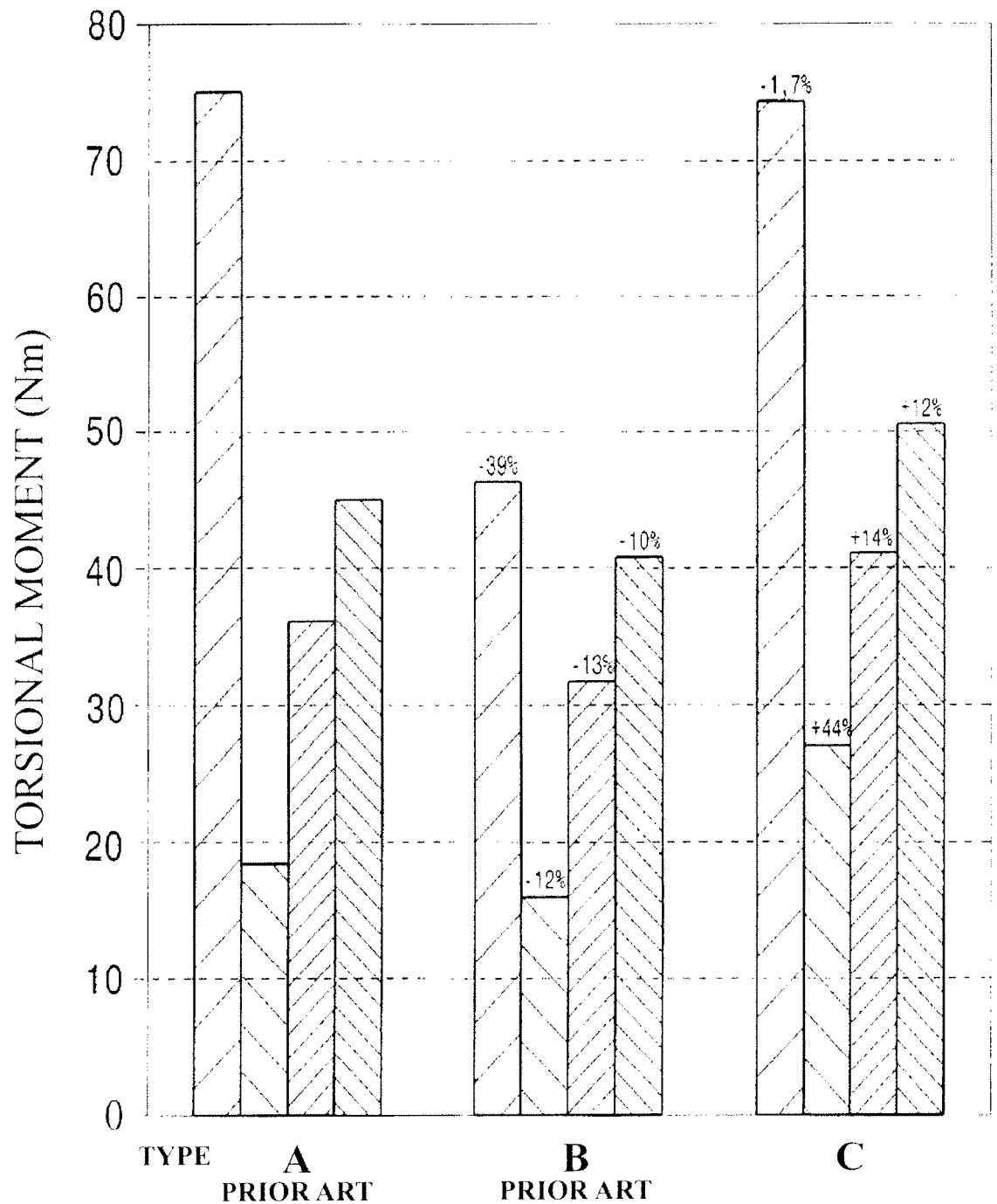
Figure 6:
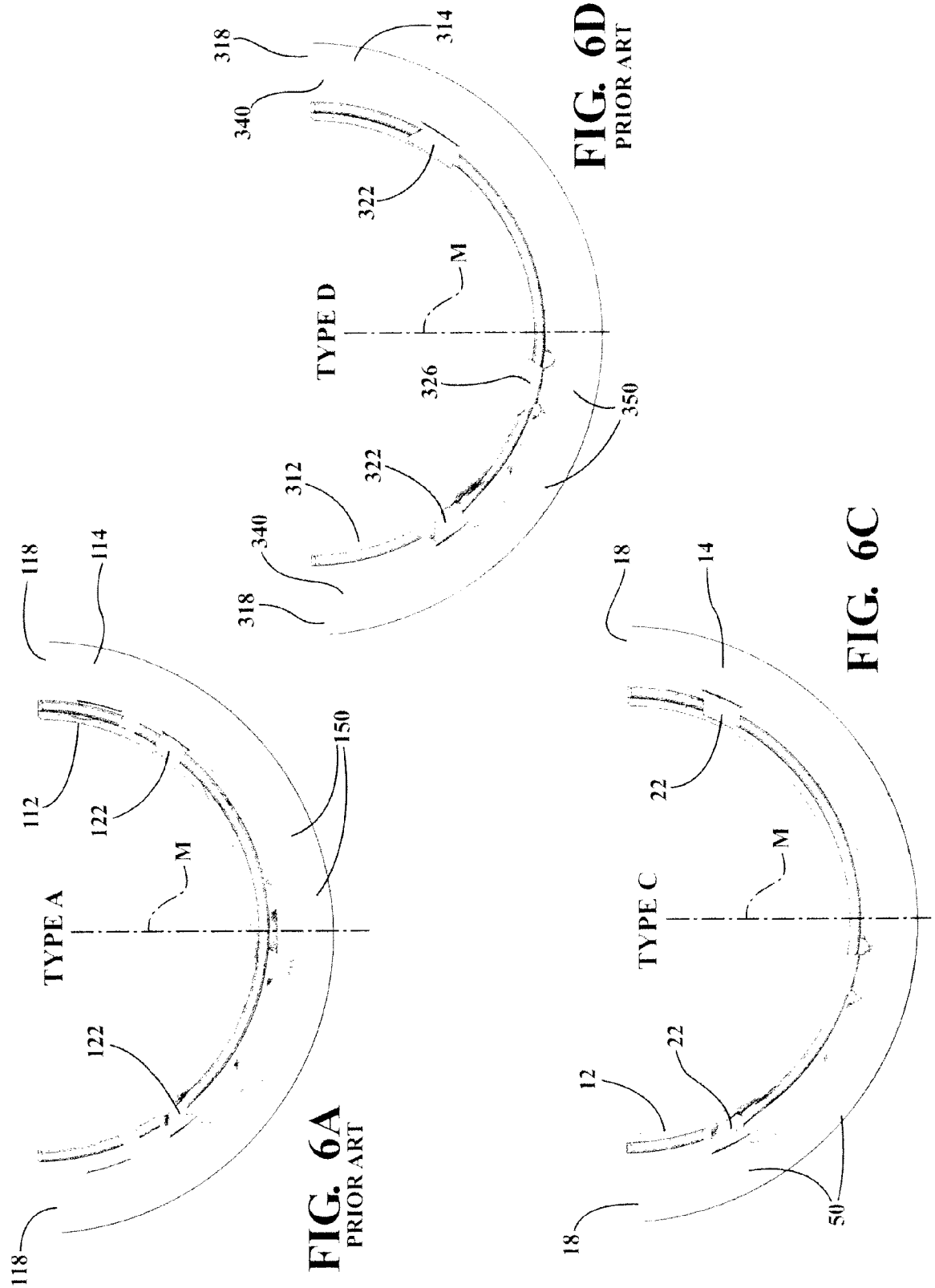
Figure 7:
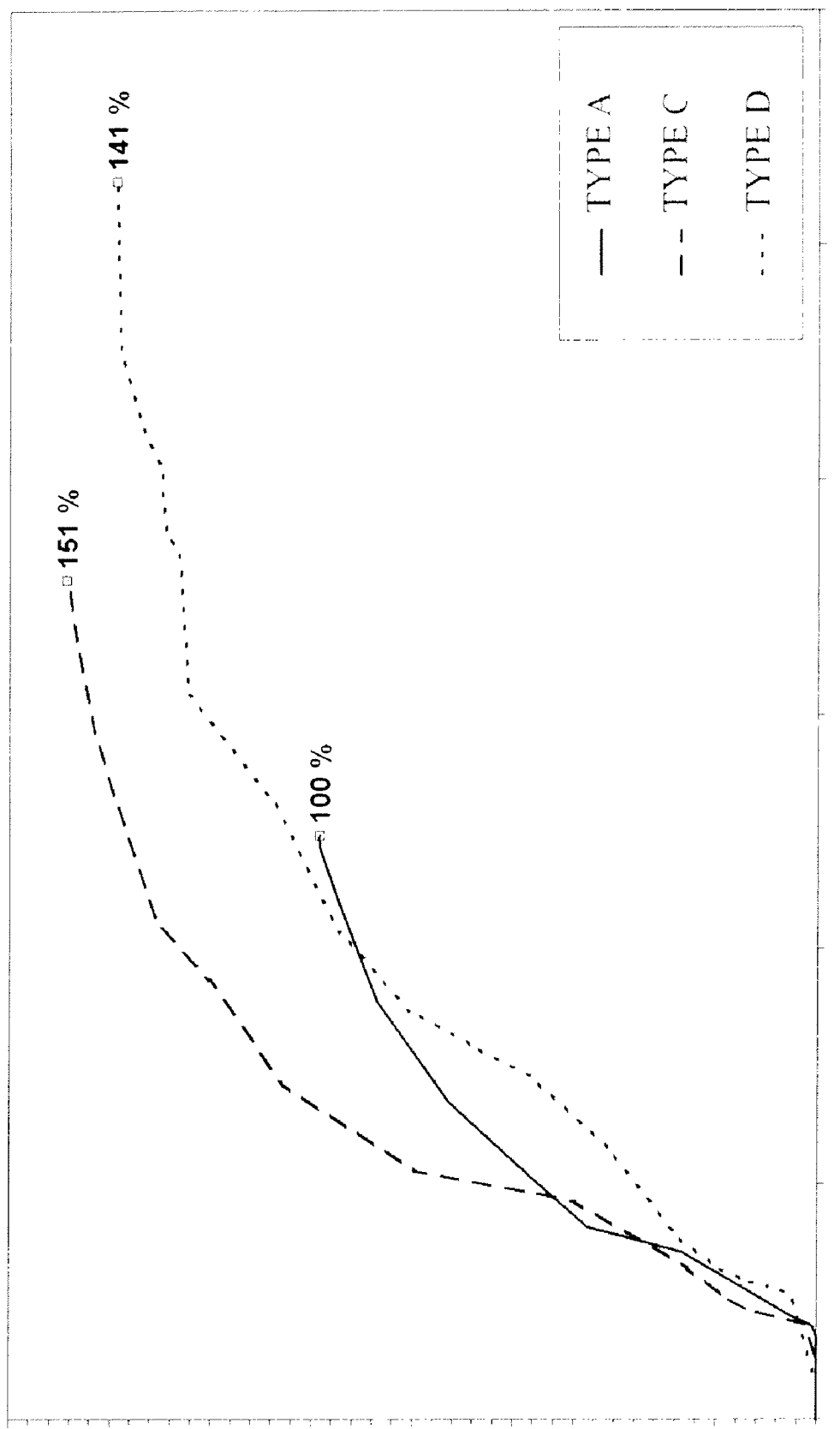

FIG. 5 shows a bar-diagram with the maximum torque loads depending on the case of loading and the bearing geometry, FIGS. 5, 6A, 6C and 6D show a further comparison of the radial-axial bearing according to the present invention (FIG. 6C) in comparison to the prior art (FIGS. 6A and 6D), and FIG. 7 shows a two-dimensional diagram, which reflects the relation between a torsion angle and a twisting moment for the three types of construction according to FIGS. 6A, 6C and 6D.

DETAILED DESCRIPTION

Figure 1:
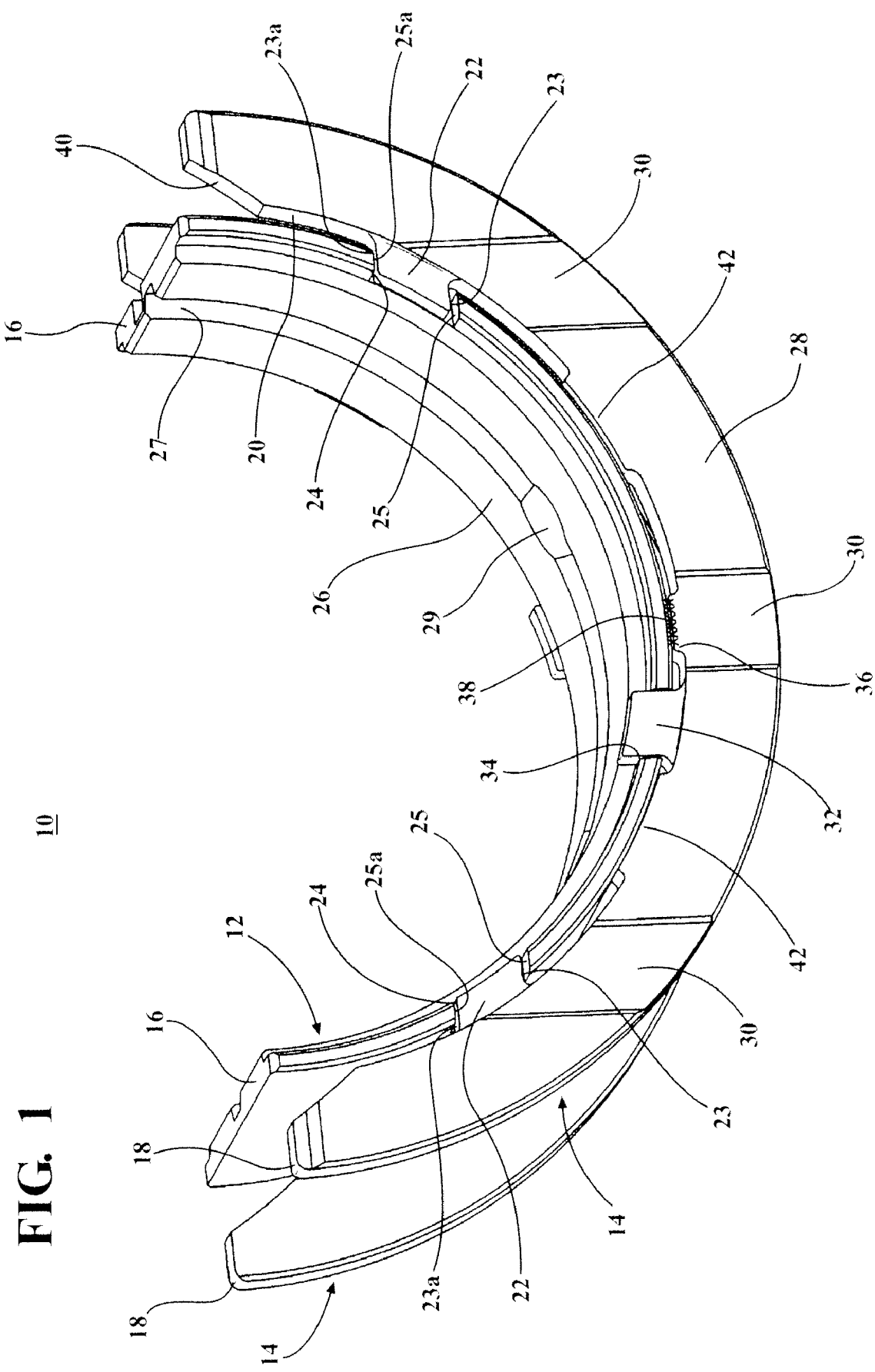
FIG. 1 shows an execution example of the radial-axial bearing according to the present invention in three-dimensional representation.
Figure 2:
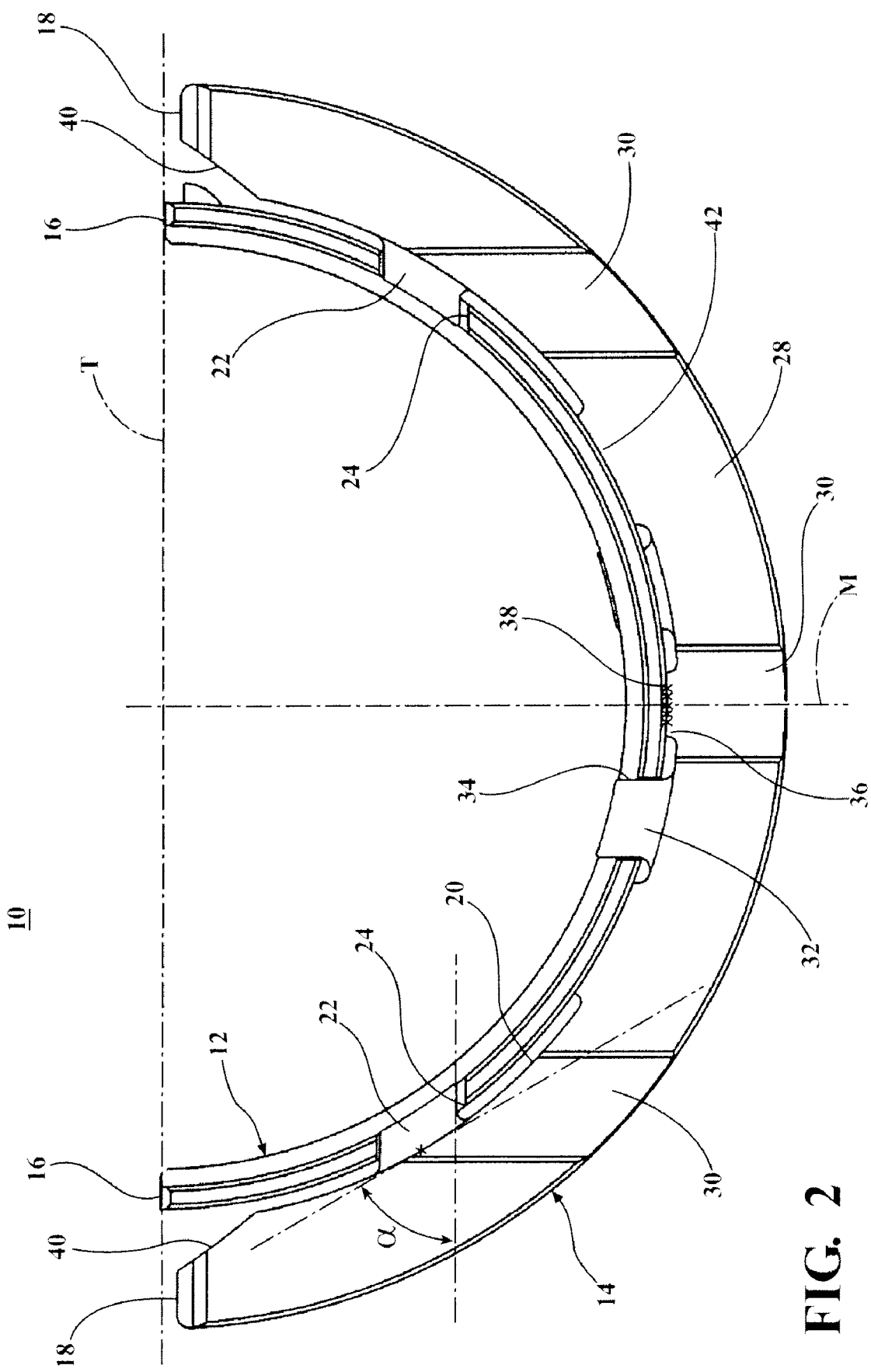
FIG. 2 shows the execution example according to FIG. 1 in the lateral view.

The radial-axial bearing 10 according to the present invention according to FIGS. 1 and 2 has a radial bearing part 12 in semi-cylindrical form (bearing half-shell, which ends in the circumferential direction at the so-called partial surfaces 16, as well as in each case a thrust washer 14 located at its axial (or frontal ends) in the form of a semi-circular flanged ring. Depicted in the figures is the so-called upper shell of a crankshaft-main bearing, for which a (not depicted) complementary lower shell exists. The upper shell and the lower shell are joined to a cylindrical bearing in a bearing house with the partial surfaces 16 lying flush on top of each other.

The circumferential ends 18 of the thrust washer 14 are moved back in the circumferential direction in relation to the partial surfaces 16 of the radial bearing part, thus shorter, so that in the composite state of the bearing they do not contact the thrust washer of the corresponding upper shell and thus are arranged individually free to move in their bearing seat. The plane bisecting the bearing 10 is meant in terms of the patent claims as a partial plane, which is plotted in the depiction of FIG. 2 as the dot and dash line T and in which the partial surfaces 16 also lie.

The thrust washers 14 have two outer connection pieces 22 radially inward-directed on their inner edge 20, which engage in corresponding, radially outer and axially frontal recesses 24 in the radial bearing part 12 and in this manner create a positive-locking connection between the thrust washer 14 and the radial bearing part 12.

The connection piece 22 has an inner edge 23 facing the centerline M and the corresponding recess 24 has an inner edge 25 facing the centerline M. A play can be detected between both of the inner edges 23 and 25, which is necessary in order to press together the bearing half shell 12 radially inwards during the assembly of the radial-axial bearing 10 to its circumferential ends lying in the area of the partial surfaces 16 and to be able to remove the (not detectable) spread angle. In this connection, the two, free ends of the bearing half-shell 12 are bent elastically radially inwards relative to the thrust washer 18, whereby at the same time the inner edge 25 of the recess 24 is lifted in relation to the inner edge 23 of the connection piece 22, until both inner edges 23, 25 abut against the other in a positive-locking manner.

As is known, the radial bearing part 12 is coated along its radially inward running surface 26 with a bearing metal and/or a sliding layer. Also, the thrust washer 14 is furnished on its running surface 28 directed axially outwards with a bearing metal and/or a sliding layer. The running surface 28 of the thrust washer 14 is interrupted by three grooves 30, which serve to supply the bearing with lubricants and divide the running surface 28 into 4 segments. The running surface 26 of the radial bearing part has a circumferential oil groove 27 and an oil hole 29. The aforementioned details are to be understood as exemplary and not as restrictive. In particular, the running surface of the thrust washer can be subdivided by fewer or more than 3 grooves and the running surface of the radial bearing part can be furnished without an oil groove and with other structures and/or profiles.

The thrust washer 14 also has a third, radially inward-directed, central connection piece 32 on its inner edge, which is located offset to the centerline M and engages in a corresponding recess 34 in the radial bearing part 12. As can best be discerned in FIG. 1, a slight play exists between the central connection piece 32 and the central recess 34, so that at this point no significant relative movement in the circumferential direction is permitted between the radial bearing part 12 and the thrust washer 14. All three connection pieces 22, 32 in connection with the corresponding recesses 24, 34 in the assembled and mounted state of the bearing 10 define both the radial position as well as the angle position of the thrust washer 14 relative to the radial bearing part 12 fixed in the bearing seat.

Only for the purpose of assembly the thrust washer 14 and the radial bearing part 12 in the region of the summit are fixed to each other by means of a welded connection 38 at the radially inward-directed prominence 36, provided specifically for this at the thrust washer 14. After this, the thrust washer 14 and the radial bearing part 12 are connected with each other in an undetachable manner up to the intended operation. The welded connection 38 is designed so that it breaks through the operational loading, for example, during the start-up of the mounted shaft. Since the three recesses 24, 34 are in each case open on the face, the thrust washers 14 have freedom of movement in the axial direction in operation. Through this an adequate play arises in the bearing seat between the thrust washer 14 and the radial bearing part 12, which compensates production tolerances of the bearing elements (bearing seat, bearing housing, radial-axial bearing) and/or of the counter-rotor (crankshaft, etc.) and concentricity inaccuracies resulting therefrom.

The two outer connection pieces 22 are located in the circumferential direction on both sides of the centerline M and symmetrically to the latter. They are also located spaced inwardly apart from the partial plane T bisecting the flanged ring in the circumferential direction—here by approximately ⅙ of the circumferential length of the inner edge 20. Several criteria are crucial for the extent of the distance to the partial plane: The arrangement must ensure that the radial bearing part 12 in the circumferential end areas close to the partial surface 16 is adequately free to move in the radial direction.

The thrust washer 14 should be stamped out in the savings known per se, with which the least possible cuttings arise in the space between two thrust washers successively stamped out from a band material. The savings is discernible in the example of FIGS. 1 and 2 at the curved recesses 40 located close to the circumferential ends.

As is best discernible in FIG. 1, the outer connection pieces 22 also have an outer edge 23a turned away from the centerline in each case, which runs parallel to the respective inner edge 23. On the one hand, this has the advantage that the radial bearing part 12 in a simple working step from a manufacturing standpoint can be designed with the corresponding recesses 24 with likewise parallel inner and outer edges 25 or 25a. The stamping step is preferably effected in a stamping-bending machine, in which a board stamped out of a band material can be transformed into a half shell-shaped radial bearing part 12 and subsequently can be stamped without re-clamping of the workpiece. On the other hand, this geometry has the advantage, that the connection piece 22 can be arranged in the circumferential direction further to the outside, without a savings being involved. The connection pieces 22 arranged far outside thereby arrange for the greatest possible torque support, which counteracts a twisting of the thrust washer 14 in relation to the radial bearing part 12.

The thrust washer 14 also has two radially inward-directed supports 42, located on its inner edge 20, which are arranged symmetrically to the centerline M on both sides of the same and still inside of the two outer connection pieces 22. This arrangement of the supports 42 near the centerline does not hinder the free radial movement of the circumferential ends of the bearing shell 12, but on the other hand defines the radial distance between the thrust washer 14 and the radial bearing part 12. It is also the purpose of the support 42, in the case of operational loading of the thrust washer to support the latter in conjunction with the connection pieces 22, 32 in the radial direction against the radial bearing part 12 firmly fixed in the bearing seat.

As is discernible in FIG. 2 by means of auxiliary lines, the invention stipulates, that the inner edges 23 and 25 of the outer connection pieces 22 or recesses 24 includes an angle α, which is between 45° and 85°, preferably between 55° and 75° and particularly preferable between 60° and 70°, in the execution example shown at 65°, with the tangent connected in the center point of the connection piece or recess to the semi-circle described by the thrust washer (or bearing shell). At the same time, in the case of the example according to FIGS. 1 and 2, the inner edges 23 and 25 are aligned parallel to the partial plane T, whereby a deviation from the parallelism by an angle, which is not greater than ±15°, preferably not greater than ±10° and particularly preferable not greater than ±5°, is tolerable with regard to the effect of the geometry according to the present invention.

In FIGS. 3A to 3D four cases of loading are sketched in an exemplary manner, which are subsequently taken as the basis for a comparative analysis of the load capacity of the radial-axial bearing according to the present invention and of the two known radial-axial bearings.

Figure 3A:
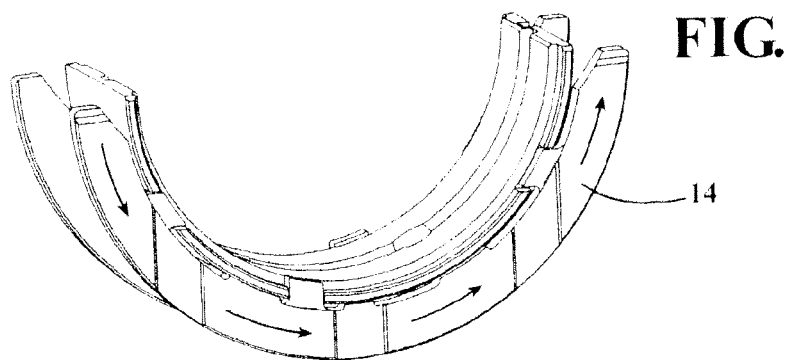
FIGS. 3A-3D show the radial-axial bearing according to the present invention in four different cases of loading.

In FIG. 3A a case of loading is sketched, in which a pure torque acts on the thrust washer 14 at the center point of the bearing, i.e., at the intersection point between the partial plane T and the centerline M. Based on the production tolerances this represents an unlikely case of loading in practice.

Figure 3B:
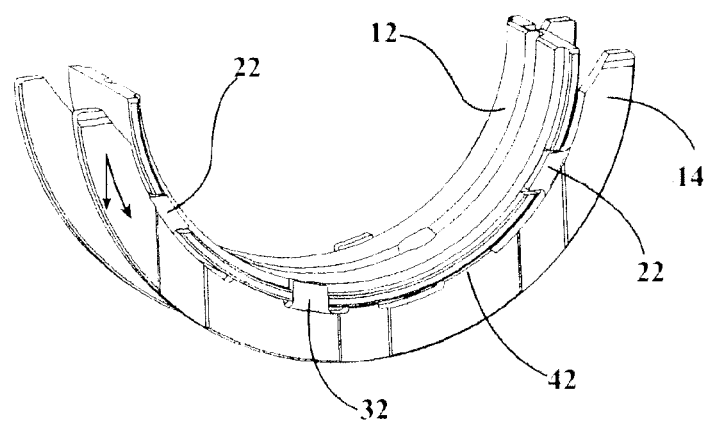

In FIG. 3B a case of loading is depicted, in which only in the left outer segment of the running surface of the thrust washer 14 a torque at the center point of the bearing and superimposed affects a vertical force directed downwards. The resulting force is essentially derived from the inner edge 23 of the left connection piece 22 via the inner edge 25 of the recess 24 and to a lesser extent based on a breakdown torque from the central connection piece 32 as well as the outer (upper) edge of the right outer connection piece 22 of the thrust washer 14 via in each case the corresponding edges of the recesses 24 or 34.

Figure 3C:
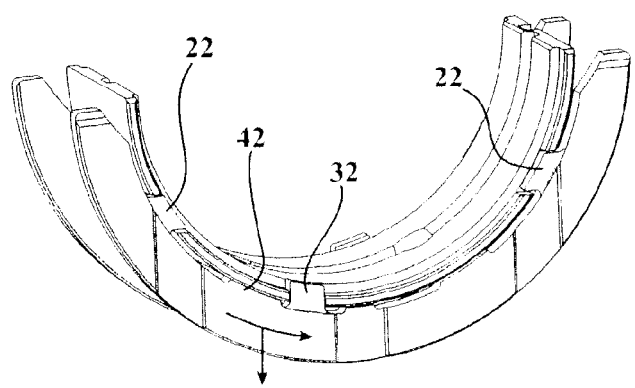

In FIG. 3C a case of loading is depicted, in which only in the left inner segment of the running surface of the thrust washer 14 a torque at the center point of the bearing and superimposed affects a vertical force directed downwards. The force resulting from this is essentially derived from the inner edge 23 of the left connection piece 22 via the inner edge 25 of the left recess 24 and to a lesser extent also from the inner edge 23 of the right connection piece 22 via the inner edge 25 of the right recess 24 and from the right edge of the central connection piece 32 via the corresponding edge of the recesses 34.

Figure 3D:
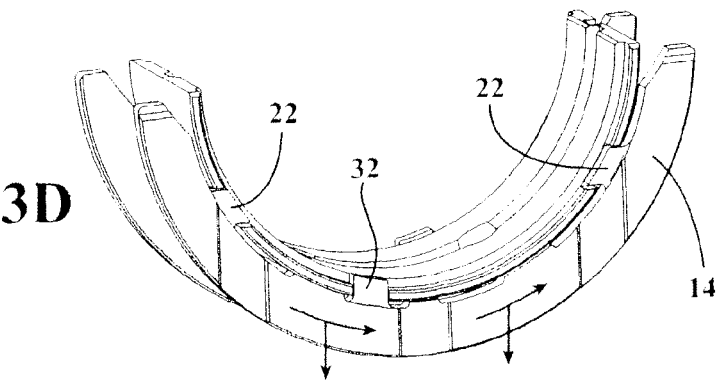

Lastly, in FIG. 3D a case of loading is depicted, in which in both central segments of the running surface of the thrust washer 14 in each case a torque at the center point of the bearing and superimposed in each case affects a force component directed downwards perpendicular to the partial plane. The force resulting from this as in the case of loading from FIG. 3C is essentially derived from the inner edge 23 of the left connection piece 22 via the inner edge 25 of the left recess 24 and to a larger extent compared to the case from FIG. 3C also from the inner edge 23 of the right connection piece 22 via the inner edge 25 of the right recess 24 and to a lesser extent from the right edge of the central connection piece 32 via the corresponding edge of the recesses 34.

Figure 4A:
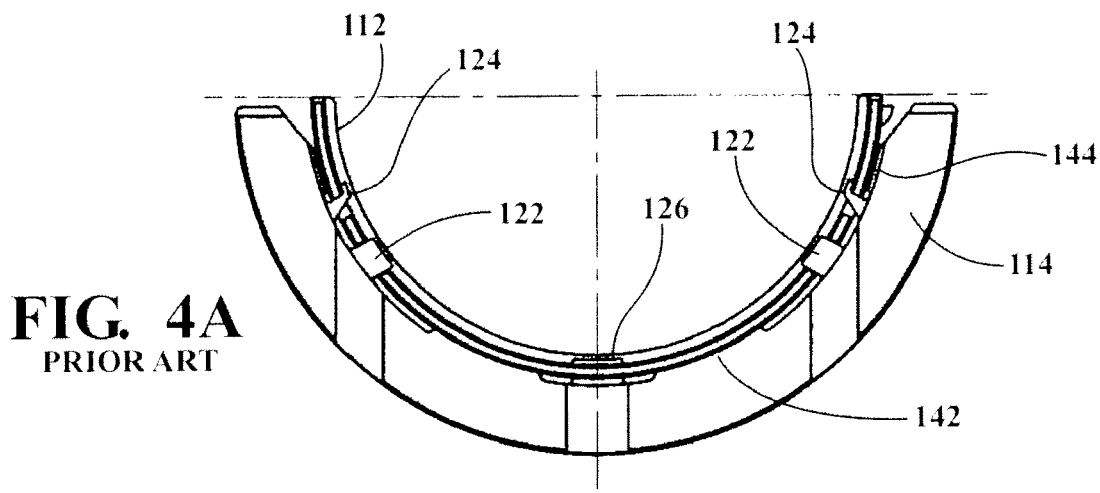
FIGS. 4A-4C show the radial-axial bearing according to the present invention (FIG. 4C) in comparison to the prior art (FIGS. 4A 4B)
Figure 4B:
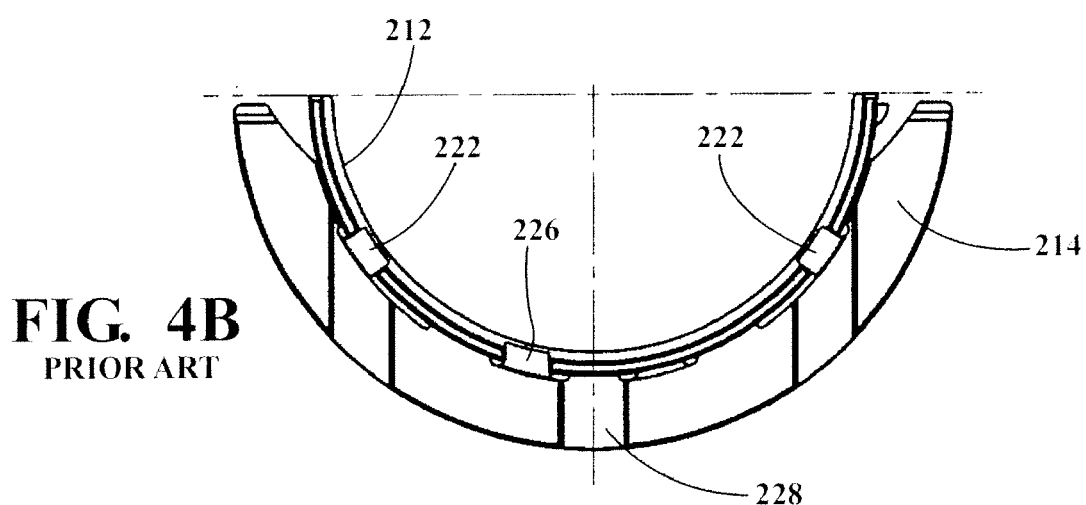

In FIGS. 4A and 4B two radial-axial bearings (more precisely half bearings) are shown according to the prior art. FIG. 4A shows a so-called built-up flange bearing, in which the thrust washer 114 is connected with the radial bearing part 112 in a positive-locking manner by means of two outer connection pieces 122 as well as further outer latched and hooked connection pieces 124 and a central and fixed connection piece 126. Also, outer support 144 arranged in each case in the circumferential direction outside of the connection pieces 122, 124 provides for a positive-locking connection alongside both of the inner supports 142.

In FIG. 4B, a spot-welded radial-axial bearing or a half-bearing of the known type of construction is depicted, in which the outer connection pieces 222 have a conventional geometry with inner and outer edges running radially. The central connection piece 226 is arranged asymmetrically different than in the example FIG. 4A and identical with the embodiment according to the present invention, so that the thrust washer 214 can be welded with the radial bearing part 212 at its prominence 228 arranged symmetrically to the centerline. Otherwise the type of construction according to FIG. 4B corresponds to that of the half bearing according to FIG. 4A.

Figure 4C:
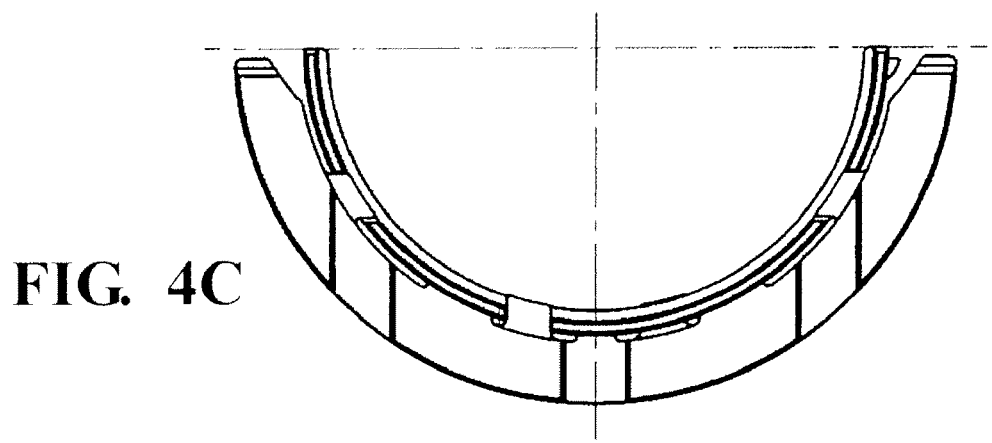

FIG. 4C shows the thrust washer according to the present invention, which was presented with reference to FIGS. 1 and 2. All three thrust washers according to FIGS. 4A to 4C have the same dimensions and material properties except for the previously described particulars.

The implementation of a simulation calculation according to FIGS. 3A to 3B yielded the load limitations apparent from FIG. 5. From left to right the four results according to FIGS. 3A, 3B, 3C and 3D are summarized in each case for a type of construction of the radial-axial bearing according to FIGS. 4A to 4C, in which the designations "A," "B," and "C" denote the respective type of construction. The percentage figures in the bars of the "B" and "C" types of construction indicate the load limitations relative to that of the "A" type of construction.

The value of the twisting moment is indicated as the load limit, in which a 5% malleable deformation of the area of the connection piece 22 or of the corresponding recess 24 occurs. The deformation or a breakage can lead to a loosening of the connection between the bearing half-shell and the thrust washer. Through this the thrust washer would be able to fall from the bearing seat and correct axial crankshaft guidance would no longer be ensured. At the worst, even debris can develop, which can reach the lubrication gap between the sliding bearing (radial and/or axial part) and the counter-rotor (crankshaft) and can cause still greater damages there.

It is clear, that the "B" type of construction is inferior in all four cases of loading to the "A" type of construction of the built-up flange bearing. This is because, in each case, breakdown torques emerges in the absence of outer support in the case of the type of construction according to Figure "B," which increases the load of the connection pieces 222.

The radial-axial sliding bearing according to the present invention ("C" type of construction) shows better value compared to the "B" type of construction in all cases of loading. In the comparison to the built-up bearing ("A" type of construction) only in the case of a pure torque load according to the case of loading according to FIG. 3A is a slightly reduced load capacity of 1.7% ascertainable. In all three other cases of loading the maximum load capacity is clearly increased compared to that of the construction type "A.".

In FIGS. 6A and 6D two radial-axial bearings (more precisely half-bearings) are shown of a known type of construction. FIG. 6A corresponds to the type of construction according to FIG. 4A, in which for the sake of simplified illustration both of the outer latched connection pieces 124 were left out. Otherwise, the bearing geometries are in agreement.

Construction type C according to FIG. 6C corresponds identically to the type of construction according the present invention of the half-bearing from FIGS. 1, 2 and 4C.

Construction type D according to FIG. 6D is a known type of construction described for the first time here, as is known for example from DE 40 15 256 A1. The half-bearing in turn consists of a radial bearing part 312 and a thrust washer 314, which are connected with each other in a positive-locking manner by means of two outer connection pieces 322 and a central connection piece 326. The most striking difference with regard to construction type A and with regard to construction type C is the geometry of all three connection pieces as well as the recesses complementary thereto in the radial bearing part 312. The three connection pieces 322, 326 are designed in a dovetail-shape, i.e., they have a cross-section increasing radially directed inward, so that they form undercuts on both sides viewed in the radial direction. The respectively dedicated recess in the radial bearing part has inner and outer edges complementary thereto, so that one of the three connection pieces 322, 326 already suffices in order to fix the thrust washer 314 in the radial direction with regard to the radial bearing part 312. Otherwise, the geometries differ in that both of the connection pieces 322 of the known construction type D are located closer to the center point M compared to both of the outer connection pieces of the construction type C according to the present invention, so that the intermediate angle of both of the outer connection pieces 322 is smaller than the intermediate angle between both of the outer connection pieces 22. The reason for this changed geometry is the savings already addressed further above, which based on the connection pieces 322 expanding radially inwards can only be realized, if the latter continue to be arranged toward the centerline M. While both of the outer connection pieces 322 of the known construction type D are arranged in the circumferential direction at the same location, as the connection pieces 22 of the construction type C according to the present invention and one would theoretically continue both of the curved recesses 340, whose radius corresponds to the outer circumference of the thrust washer 314, then these recesses, thus the cross section of the thrust washer subsequently stamped out from the band material, also cut the outer corner of the outer connection pieces 322.

FIGS. 6A to 6D show the three construction types in each case in their maximum load condition in the case of loading, which is depicted in FIG. 3B. The loading leads in each case to a displacement of the thrust washer compared to the radial bearing parts, as can be discerned by means of the different gap widths between the thrust washers and the radial bearing parts on both sides of the centerline, to a load distribution within the thrust washers and the radial bearing part, which are depicted in the form of isolines 50, 150 or 350, and lastly to a deformation of the thrust washers overall as well as of the connection pieces in particular.

In FIG. 7, the connection between the exerted twisting moment and the torsion angle of the thrust washer specific to the type of construction resulting from this is shown in the case of loading according to FIG. 3B and the construction types from the FIGS. 6A to 6D. The angle is to be understood as the torsion angle, at which a contrived connection line is inclined between both of the circumferential ends 18,188 or 318 of the thrust washers compared to their (horizontal) starting position. The continuous line describes the connection in the case of the known construction type A. The curve shows that the maximum twisting moment, which is understood here as reference value (100%), is already achieved in the case of a small torsion angle. In the case of further twist, i.e., the increase in the torsion angle, you would find that the twisting moment required for this declines again. All three curves are plotted according to this principle, i.e., they end in the case of their respective maximum achievable twisting moment. While the known construction type D withstands a greater twisting moment at 41% than the known construction type A, cf. dotted line, it attains in this connection torsion more than twice as large. However, in such a large case of loading the geometry of the radial-axial bearing and in particular of the thrust washer already changes, so that permanent damages of the bearing and/or the counter-rotor can be the result. As can be learned from the dashed line, the construction type C according to the present invention withstands the greatest twisting moment, which is at least 51% greater than the maximum twisting moment of construction type A, and attains this with a torsion angle only slightly greater than the known construction type A. Overall construction type C thus proves to be the firmest solution, which at the same time still permits a savings.

Even though the execution example shown is a radial-axial bearing, which has two thrust washers, the invention is not restricted to this, but rather can also be applied to single-sided flanged bearings. Also, the radial bearing part divergent from the execution example shown of a semi-cylindrical bearing shell can also be designed as a bushing. Even though the circumferential ends of the thrust washers according to the example of the invention shown compared to the partial surfaces of the radial bearing part are moved back, are thus shorter, it becomes clear from the preceding, that the invention is not restricted by this geometrical detail. In particular, it is not opposed to the invention to also extend the circumferential ends of the thrust washer beyond the bisecting partial plane.

The invention claimed is:

1. Thrust washer (14) in the form of a semi-circular flanged ring with at least two outer connection pieces (22) radially inward-directed on the inner edge of the thrust washer (14) for the connection with a radial bearing part (12), which are located in the circumferential direction on both sides of the contrived center line (M) of the thrust washer (14) and in each case have an inner edge (23) facing the centerline (M) and an outer edge (23a) turned away from the centerline (M), wherein the inner edges (23) in each case include an angle ($\alpha$), which is between 45° and 85°, with a tangent on the inner side connected in the center of the connection piece (22) at the semi-circle described by the thrust washer (14), and that the outer edge (23a) runs parallel to the respective inner edge (23) and wherein the outer connection pieces (22) are arranged spaced apart from a partial plan (T) bisecting the flanged ring.

2. Thrust washer (14) according to claim 1, wherein the inner edges (23) of the outer connection pieces (22) run parallel to the partial plane (T) or include an angle with the latter, which is not greater than ±15°.

3. Thrust washer (14) according to claim 1, wherein the outer connection pieces (22) are arranged symmetrically to the centerline (M).

4. Thrust washer (14) according to claim 1, including a third central connection piece (32) radially inward-directed, located at the inner edge, which is arranged offset to the centerline (M).

5. Thrust washer (14) according to claim 1, including two supports (42) radially inward-directed, located on its inner edge.

6. Thrust washer (14) according to claim 5, wherein the supports (42) are arranged symmetrically on both sides of the centerline (M) and inside of at least two connection pieces (22).

7. Radial-axial bearing (10) with a radial bearing part (12) and a thrust washer (14) connected with the radial bearing part (12), in which outer connection pieces (22) of the thrust washer engage in corresponding frontal outer recesses (24) in the radial bearing part (12), which in each case have an inner edge (25) facing a contrived centerline (M) of the thrust washer (14), which includes an angle ($\alpha$), which is between 45° and 85°, with a tangent connected in a center of the recesses (24) at the circle or semi-circle described by the radial bearing part (12), and in each case have an outer edge (25a) turned away from the centerline (M) of the thrust washer (14), which runs parallel to the respective inner edge (25), and wherein the recesses (24) are arranged spaced apart form a partial plane (T) bisecting the flanged ring.

8. Radial-axial bearing (10) according to claim 7, wherein the inner edges (25) of the recesses (24) facing the centerline (M) run parallel to the partial plane (T) or include an angle with the latter, which is not greater than ±15°.

9. Radial-axial bearing (10) according to claim 7, wherein the thrust washer (14) is connected with the radial bearing part (12) by means of a welded connection (38).

10. Radial-axial bearing (10) according to claim 9, wherein the welded connection (38) is designed as a predetermined breaking point, which breaks during the start-up of the counter-rotor to be mounted.

11. Radial-axial bearing (10) according to according to claim 10, wherein the thrust washer (14) is welded with the radial bearing part (12) in a summit region of the bearing part (12).

12. Radial-axial bearing (10) according to claim 9, wherein the thrust washer (14) is welded with the radial bearing part (12) in a summit region of the bearing part (12).

13. Radial-axial bearing (10) according to claim 7, wherein the radial bearing part (12) is a bearing half-shell.

\* \* \* \* \*

UNITED STATES PATENT AND TRADEMARK OFFICE
CERTIFICATE OF CORRECTION

PATENT NO. : 8,376,618 B2  
APPLICATION NO. : 12/742826  
DATED : February 19, 2013  
INVENTOR(S) : Lehmann et al.

Page 1 of 1

It is certified that error appears in the above-identified patent and that said Letters Patent is hereby corrected as shown below:

In the Claims

| Claim 11, column | line | |
|---|---|---|
| 12 | 30 | "according to according to" should read "according to" |

Signed and Sealed this  
Second Day of July, 2013

Teresa Stanek Rea  
*Acting Director of the United States Patent and Trademark Office*